United States Patent
Payne

[11] Patent Number: 5,890,691
[45] Date of Patent: Apr. 6, 1999

[54] BICYCLE SEAT SUPPORT WITH ROTATIONALLY-BIASED CENTERING MECHANISM

[76] Inventor: Ronald A. Payne, 606 Amick Rd., Chesapeake, Va. 23325

[21] Appl. No.: 644,198

[22] Filed: May 10, 1996

[51] Int. Cl.[6] .................................... B62J 1/02
[52] U.S. Cl. .................. 248/289.31; 248/417; 248/418; 297/215.15; 403/116
[58] Field of Search .............................. 248/289.31, 417, 248/425, 600, 601, 418, 415, 131; 297/195.1, 209, 201, 312, 208, 210, 215.15, 344.21; 280/275, 283; 267/132, 155; 403/116, 113, 112

[56] References Cited

U.S. PATENT DOCUMENTS

| | | |
|---|---|---|
| 478,581 | 7/1892 | Elmore . |
| 1,270,729 | 6/1918 | Harris .................................. 248/415 X |
| 1,337,221 | 4/1920 | Hansen ................................ 248/417 X |
| 1,479,882 | 1/1924 | Walton .................................... 248/417 |
| 1,532,354 | 4/1925 | Walton .................................... 248/417 |
| 1,578,784 | 3/1926 | Walton .................................... 248/417 |
| 2,691,407 | 10/1954 | Kupaki .................................... 248/417 |
| 3,055,628 | 9/1962 | Savage .................................... 248/417 |
| 3,199,826 | 8/1965 | Miller et al. ............................. 248/417 |
| 3,212,816 | 10/1965 | Nordmark ............................ 248/417 X |
| 3,837,611 | 9/1974 | Rhoades .................................. 248/417 |
| 4,613,187 | 9/1986 | Gordon .................................... 297/195 |
| 4,736,983 | 4/1988 | Furbee .................................... 297/209 |
| 4,997,232 | 3/1991 | Johnsen .................................. 297/209 |
| 5,265,838 | 11/1993 | Kjellman ................................ 248/417 |
| 5,286,082 | 2/1994 | Hanson .......................... 297/195.1 X |
| 5,622,343 | 4/1997 | Morton .......................... 248/289.31 X |

FOREIGN PATENT DOCUMENTS 30160  12/1897  United Kingdom ................... 297/201

*Primary Examiner*—Leslie A. Braun
*Assistant Examiner*—Stephen S. Wentsler
*Attorney, Agent, or Firm*—Griffin, Butler, Whisenhunt & Szipl, LLP

[57] ABSTRACT

A Bicycle Seat Support (14) includes a rotationally-biased centering mechanism (20) for coupling a seat mount (16) to a frame mount (18). The rotationally-biased centering mechanism has a biasing mechanism for causing the seat mount and an attached bicycle seat to rotate toward a normal angular position about a seat axis (36) while allowing the bicycle seat to be forced away from this normal angular position by pressure applied by a rider when pedaling the bicycle. The rotationally-biased centering mechanism includes bearing surfaces (48,50) having an interface which allows the seat mount and the frame mount to rotate while not allowing substantial axial movement. Stops are included for preventing excessive angular seat movement.

21 Claims, 4 Drawing Sheets

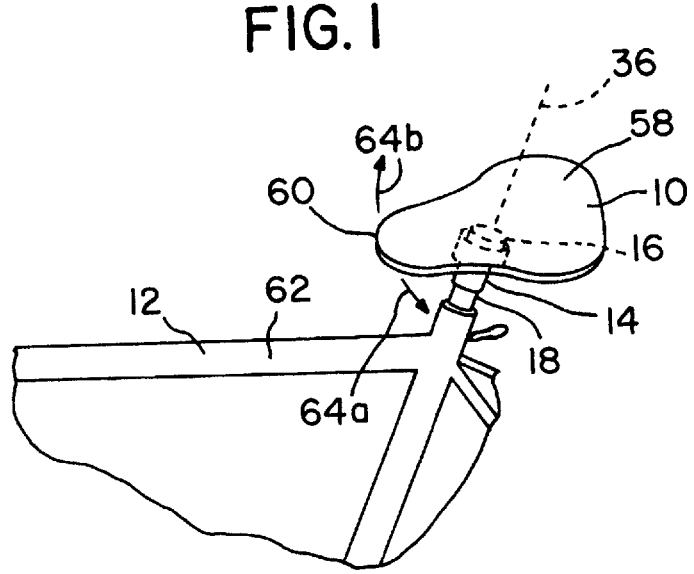
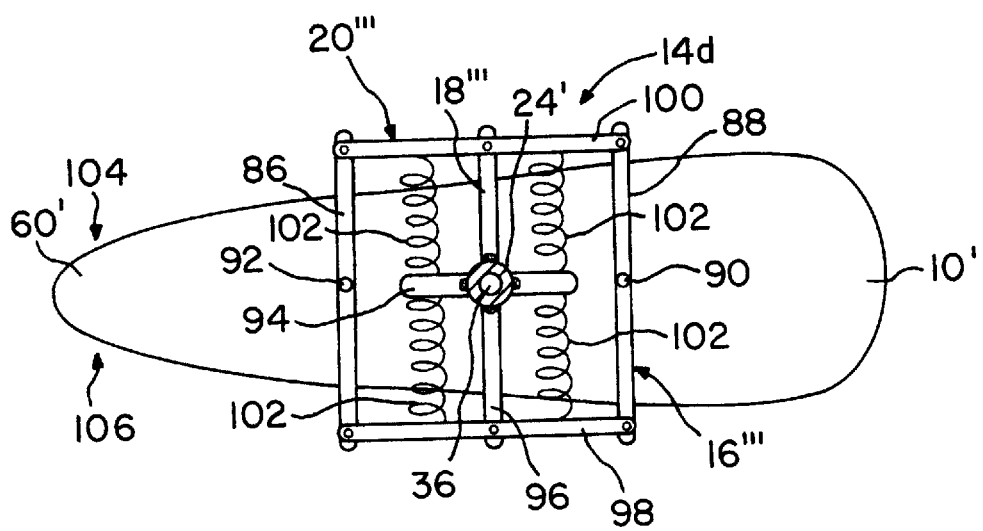

BICYCLE SEAT SUPPORT WITH ROTATIONALLY-BIASED CENTERING MECHANISM

BACKGROUND OF THE INVENTION

This invention relates broadly to the art of pedal-driven bicycles and more specifically to bicycle seats and their supports.

Bicycle riders who ride for long distances often experience friction on their thighs and buttocks with bicycle seats. Such friction is, in most cases, caused by motion of the riders when they pedal the bicycles. In this regard, when the bicycle riders pedal their bicycles, and thereby alternately apply downward pressure with their right and left legs, they shift their bodies back and forth, which causes such friction. This friction can create chafing or chapping of affected body areas. Thus, it is an object of this invention to provide a bicycle seat support which reduces friction between a seat and a rider to thereby reduce chafing of the rider.

An associated problem is that, riders are often obstructed from reaching optimum positions for applying downward pressures on bicycle pedals by bicycle seats. Thus, it is also an object of this invention to provide a bicycle seat support which allows controlled movement of a bicycle seat so that a bicycle rider can achieve more beneficial body positions for pressing bicycle pedals.

Similarly, it is an object of this invention to provide a bicycle seat support which reduces fatigue of a bicycle rider by reducing stress applied to the bicycle rider's muscles when he is pedaling.

Stated another way, it is an object of this invention to provide a stroke adjuster for a bicycle rider.

SUMMARY OF THE INVENTION

According to principles of this invention, a bicycle-seat support for supporting a bicycle seat includes a rotationally-biased centering mechanism for coupling a seat mount to a frame mount. The centering mechanism includes a biasing device for causing the seat mount, and an attached bicycle seat, to rotate toward a normal angular position, while allowing the bicycle seat to be forced away from this normal angular position in either direction by pressure applied by a rider when pedaling the bicycle. The bicycle-seat support includes bearing members which interface with one another so as to allow relative angular motion about a seat axis, extending substantially perpendicular to a top seat surface, but not to allow relative axial movement. Stops are included for preventing excessive rotation of the seat away from the normal angular position in either direction.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an isometric view of a bicycle seat mounted on a bicycle frame by a bicycle seat support of this invention, which is only shown generally;

FIG. 5 is a bottom view taken in cross section on a seat shaft of a bicycle seat support of this invention, including a bicycle seat.

DESCRIPTION OF THE PREFERRED EMBODIMENT

Figure 2:
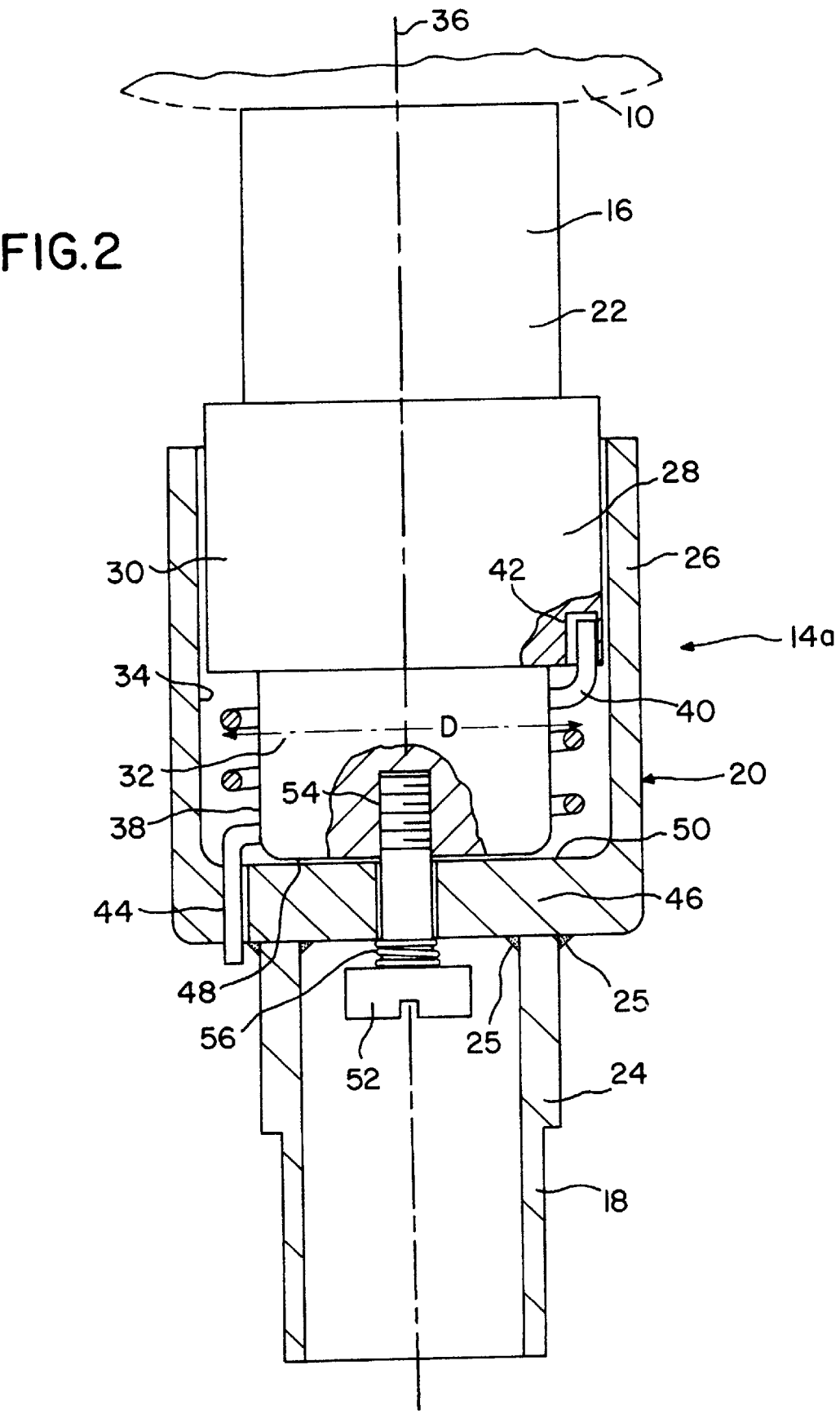
FIG. 2 is a partial cross sectional view taken along a seat axis of a first embodiment of a bicycle seat support of this invention.

A bicycle seat 10 FIG. (1) is supported from a bicycle frame 12 by a bicycle seat support 14 of this invention which is indicated only generally in FIG. 1. A first embodiment bicycle seat support 14(a) is depicted in more detail in FIG. 2.

The bicycle seat support 14(*a*) includes a seat mount 16 attached to the seat 10 (shown only schematically in FIG. 2), a frame mount 18 for being attached to the bicycle frame 12 (not shown in FIG. 2) and a rotationally biased centering mechanism 20.

The seat mount 16 is basically a solid top shaft 22 which is attached to the seat 10 and the frame mount 18 in this embodiment is a bottom shaft 24 (formed as a tube), with a stepped outer diameter. The rotationally-biased centering mechanism 20 includes a cup-shaped female telescoping member 26, which is welded to the bottom shaft 24 at 25 and a male telescoping member 28 which is affixed to a bottom end of the top shaft 22. The male telescoping member 28 can actually be formed as one solid piece with the top shaft 22.

As can be seen in FIG. 2, the solid male telescoping member 28 is inserted into the cup-shaped female telescoping member 26. The male telescoping member 28 has an upper large-diameter portion 30 and a lower small-diameter portion 32. The large-diameter portion 30 fits rather snugly in a round interior surface 34 of the female telescoping member 26, although it is free to rotate about a seat axis 36. The small-diameter portion has an outer surface 38 which is substantially spaced from the round interior surface 34 of the female telescoping member 26. A coil spring 40 is placed in this space, between the outer surface 38 of the small-diameter portion 32 and the round interior surface 34, surrounding the small-diameter portion 32, with ends thereof respectively engaging in bores 42 and 44 of the male telescoping member 28 and a bottom wall 46 of the female telescoping member 26. The small-diameter portion 32 has at its lower end a seat-mount bearing surface 48 which interfaces directly with a frame-mount bearing surface 50 formed by an interior bottom surface of the female telescoping member 26 (the top of the bottom wall 46).

The male telescoping member 28 is held in the female telescoping member 26 by a bolt 52 which passes through the bottom wall 46 to engage threads in a threaded bore 54 in the male telescoping member 28. A coil spring 56, mounted about a shaft of the bolt 52 between a head of the bolt 52 and an exterior surface of the bottom wall 46, ensures that the seat-mount and frame-mount bearing surfaces 48 and 50 are normally maintained in contact with one another but are assured of having freedom of angular movement relative to one another about the seat axis 36. The spring 56 also maintains pressure on the bolt 52 and thereby keeps it from coming unscrewed. As can be seen in FIG. 1, the seat axis 36 extends along the seat and frame mounts 16 and 18 to pass substantially perpendicular (although not normally exactly perpendicular) to a seat surface 58 of the bicycle seat 10.

In operation, the coil spring 40 is designed so that when it is in a relaxed position, a nose 60 of the seat 10 is directed toward the front of the bicycle frame 12). (that is, aligned with a cross bar 62 of the bicycle frame 12. However, if a rider straightens his right leg to apply downward pressure to a pedal (not shown) his thigh will contact the seat nose 60 thereby applying pressure to the nose in a direction indicated by an arrow 64a in FIG. 1. The seat 10, will then, rotate about the seat axis 36, with the nose 60 moving in the direction of arrow 64a and the coil spring 40 being rotated to expand its diameter D (FIG. 2). As the seat 10 rotates, outer-diameter surfaces of the coil spring 40 will eventually reach the round interior surface 34 of the female telescoping member 26, which "stops" further rotation of the seat 10 in direction 64a. In a similar manner when a rider pedals with his left leg he applies pressure against the nose 60 of the bicycle seat 10 in the direction of arrow 64b. Again, the seat is allowed to rotate, but this time the diameter of the coil spring 40 is contracted, or reduced, until its inner diameter surface eventually reaches the outer surface 38 of the small-diameter portion 32 of the male telescoping member 28. This forms a stop in the direction 64b of the seat 10. By positioning the coil spring 40 appropriately between the round interior surface 34 and the outer surface 38 one can provide approximately the same angular motion in each direction of the nose 60 of the bicycle seat 10.

Figure 3:
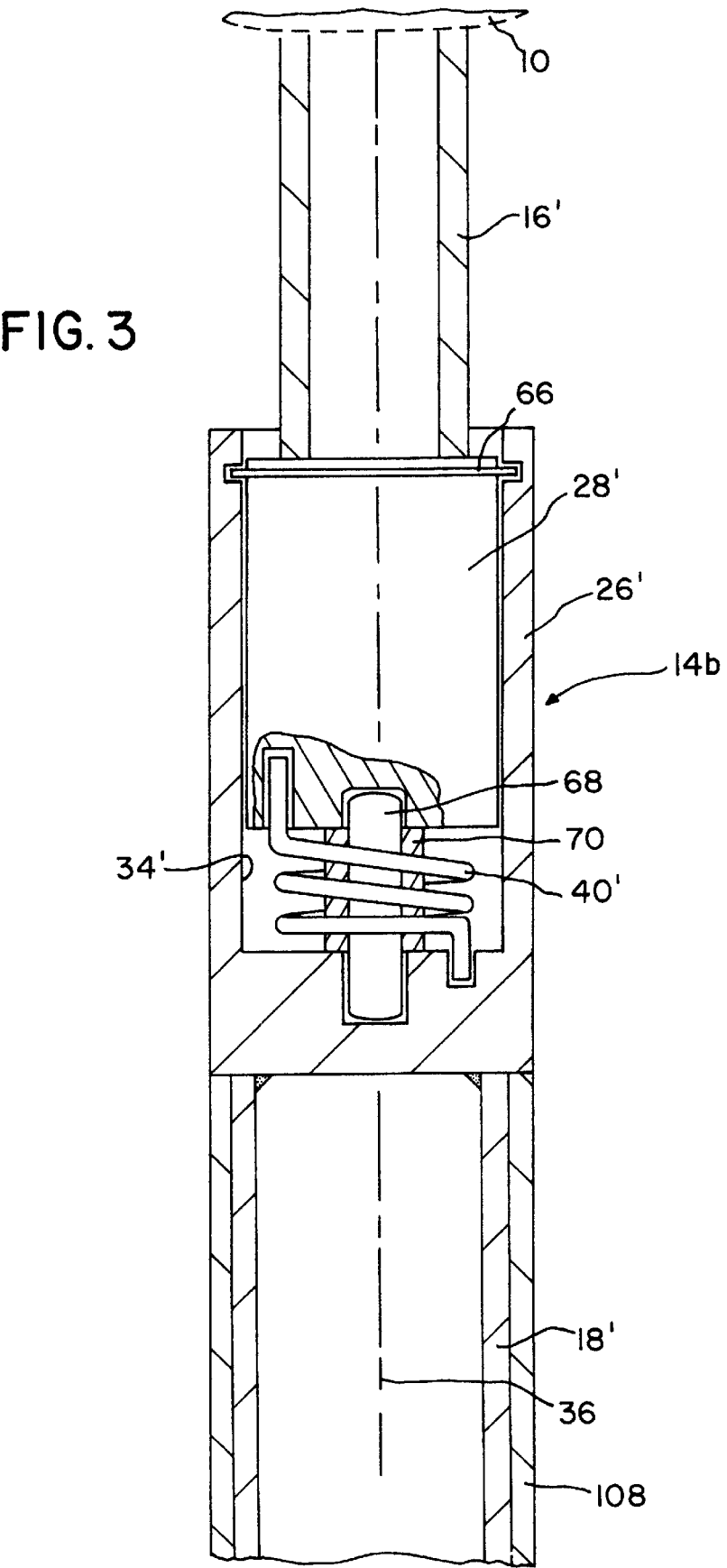
FIG. 3 is a partial cross sectional view taken along a seat axis of a second embodiment bicycle seat support of this invention.

Looking now at a second embodiment bicycle seat support 14b depicted in FIG. 3, this embodiment differs from the first embodiment depicted in FIG. 2 in that: a male telescoping member 28' is held in a female telescoping member 26' by snap ring 66 rather than by the bolt 52; a separate brass rod 68 and a brass bushing 70 form a bearing interface between the female telescoping member 26' and the male telescoping member 28', rather than having a small-diameter portion, as in FIG. 2

The second embodiment bicycle seat support 14b functions substantially the same as does the bicycle seat support 14a of FIG. 2 in that the brass rod 68 and the brass bushing 70 do not allow axial motion along the seat axis 36 but they do allow relative rotational movement between a seat mount 16' and a frame mount 18' so as to allow the biased seat motions 64a, 64b shown in FIG. 1. Again, the brass rod 68 and the brass bushing 70, as well as an interior surface 34' of the female telescoping member 26' cooperate with a coil spring 40' to provide stops in each direction 64a and 64b of the seat 10 in the same manner as was described for the coil spring 40 of the FIG. 2 embodiment.

Figure 4:
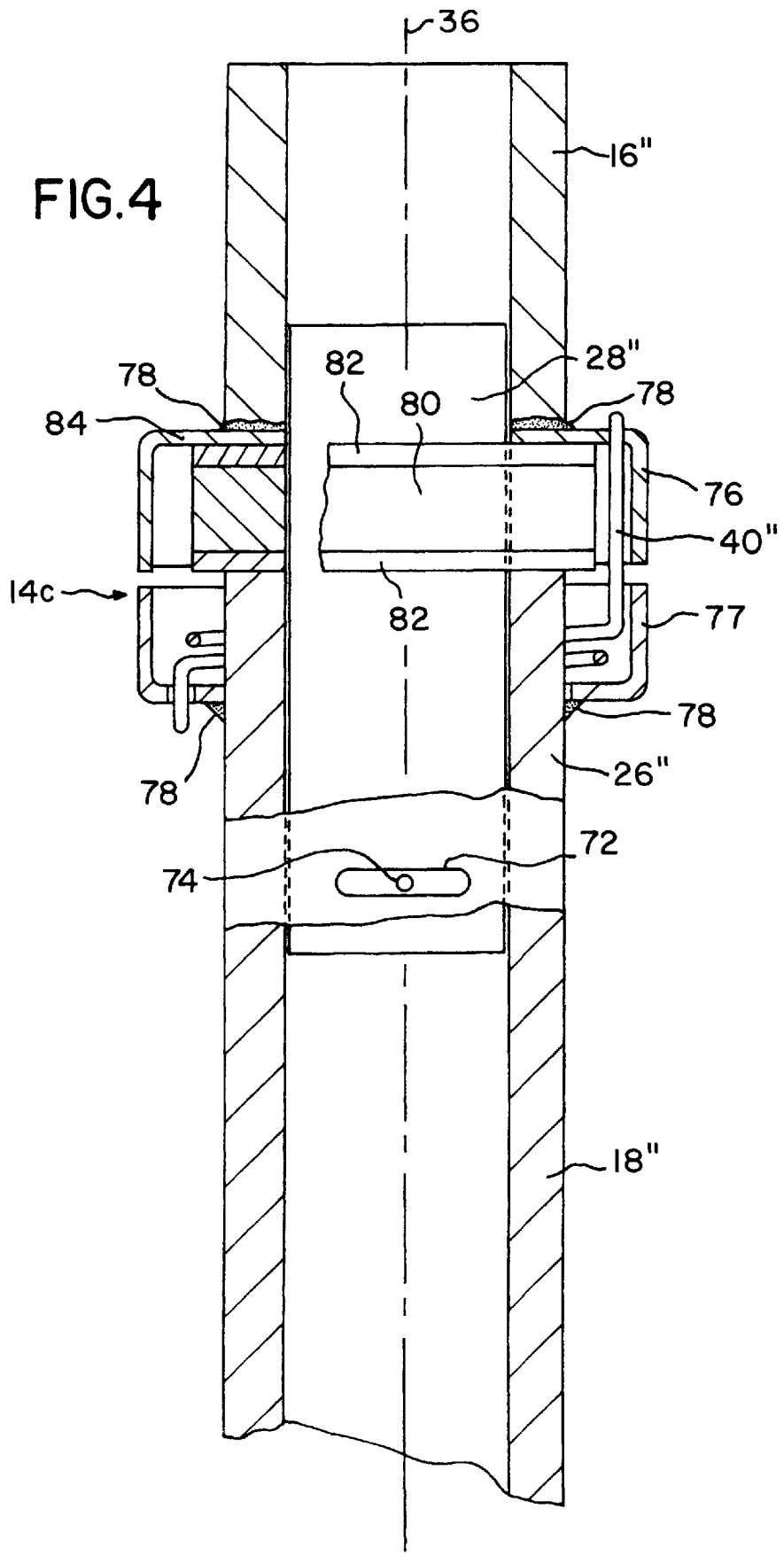
FIG. 4 is a partial cross sectional view taken along a seat axis of a third embodiment of a bicycle seat support of this invention.

Looking now at a third embodiment in FIG. 4 of a bicycle support 14c, in this embodiment, a seat mount 16" is welded to a male telescoping bar 28" while a female telescoping member 26" is simply formed as an end part of a tubulary-shaped frame mount 18". In this embodiment, a slot 72 in the frame mount 18" and a pin 74 affixed to the male telescoping member 28" provide stops which determine the amount of angular movements 64a and 64b (in FIG. 1) of the bicycle seat 10 and also prevent the seat mount 16" and the frame mount 18" from separating.

In the third embodiment of FIG. 4 there are additionally an upper case 76 and a lower case 77 which are respectively welded to the seat mount 16" and the frame mount 18" by welds 78. An annular brass bushing 80 and washers 82 are held in position between an upper end of the frame mount 18" and the interior surface of a wall 84 of the upper case 76 by the male telescoping member 28" which passes through holes in the annular brass bushing 80 and the washers 82. The brass bushing 80 and the washers 82 allow substantial the seat mount 16" and the frame mount 18' to rotate relative to one another about the seat axis 36; however, they do not allow substantial relative axial movement between the seat mount 16" and the frame mount 18". A coil spring 40" having ends attached to the upper and lower cases 76 and 77 bias the seat mount 16" to a position in which the pin 74 is in the middle of the slot 72 and the nose 60 (FIG. 1) of seat 10 is aligned with the crossbar 62.

By allowing the seat mount 16" to rotate relative to the frame mount 18" but not allowing relative axial movement between these two members the same operation described above for the bicycle seat support 14a of FIG. 2 is achieved by the bicycle seat support 14c of the third embodiment of FIG. 4.

FIG. 5 depicts yet a fourth embodiment in which a bicycle seat (10'), having a nose 60' is mounted to a bicycle by a bicycle seat support 14d. In this embodiment, a seat mount 16''' is formed of seat links 86 and 88 which are pivotally attached to the seat (10) at pivot points 90 and 92. A frame mount 18''' is formed of two cross member 94 and 96 which are rigidly attached to a bottom shaft 24', which is, in turn rigidly attached to a frame 12 (FIG. 1). A rotationally-biased centering mechanism 20''' includes intermediate links 98 and 100, which are pivotally connected to the cross member 96 and the seat links 86 and 88, and compression coil springs 102, which are coupled between the intermediate links 98 and 100 and the cross member 94 as depicted in FIG. 5. The seat 10' is shown in FIG. 5 as being aligned in a normal angular position in which its nose 60' is directed toward the front of a bicycle frame, aligned with a cross bar 62 (FIG. 1). However, if a rider's thighs exert a pressure on the nose 60', as indicated by arrows 104 and 106, the bicycle seat 10' will be rotated around the seat axis 36 in the direction 104 and 106.

It will be appreciated by those of ordinary skill in the art that the bicycle seat support of this invention allows hips of a bicycle rider to rotate horizontally by allowing the bicycle seat itself to rotate horizontally about the seat axis. When the seat rotates about the seat axis, it not only allows the rider to achieve better positions for pedaling but also prevents rubbing and chafing in the rider's crotch area.

By allowing the rider to achieve more optimal pedaling positions, the bicycle-seat support of this invention reduces twisting of the bicycle rider's back, increases the bicycle rider's endurance, and allows the bicycle rider to provide a better performance with less stress on his body.

In order for this invention to work properly, the rotationally-biased centering mechanism of the invention should allow a bicycle seat to rotate at least 25 degrees in each direction. In a preferred embodiment, however, it allows almost 90 degrees of rotation in both directions.

Although it would be possible to simply allow the seat to rotate without including a rotationally-biased centering mechanism of this invention, it has been found, that such a loose structure is not useful because it allows uncontrolled movement. The spring prevents "flapping". In this regard, the spring force should be at least 1.5 pounds in both directions.

It will be appreciated by those of ordinary skill in the art that the bicycle-seat support of this invention is designed to reduce friction and chafing to a rider's thighs and buttocks. It also serves to correct and align strokes of legs during pedaling. This reduces stress and strain over a period of time to a rider's leg muscles, back muscles, and shoulders. The correcting action provided by the bicycle-seat support of this invention gives a rider more endurance.

The motion allowed by the bicycle-seat support of this invention makes it possible for the rider's leg and back muscles to line up with a pedal during each stroking motion. That is, the muscles can push directly against the pedals in lines in which the muscles are naturally positioned, relative to the rider's skeleton. Further, this is accomplished automatically by movement of the nose of the bicycle seat in a lateral direction by thigh pressure of a rider.

While the invention has been particularly shown and described with reference to a preferred embodiment, it will be understood by those of ordinary skill in the art that various changes in form and detail may be made therein without departing from the spirit and scope of the invention. For example, a shock absorber could be included between a bike frame and a seat, combined with a bicycle seat support of this invention.

It should be understood that each of the frame mounts 18, 18', 18" can be attached directly to a bicycle frame or can be attached to a bicycle frame via a seat post. In fact, a separate seat post 108 is shown in FIG. 3 in which the frame mount 18' is inserted.

The invention claimed is:

1. A bicycle-seat support for supporting a bicycle seat on a frame of a bicycle at an attitude for allowing a rider of the bicycle to conveniently sit on a top seating surface of the bicycle seat and pedal the bicycle, said bicycle-seat support comprising:

a seat mount for being attached to the bicycle seat;

a frame mount for being attached to the frame of the bicycle;

a rotationally-biased centering means for coupling the seat mount to the frame mount, said centering means including a biasing means for causing the seat mount and the attached bicycle seat to rotate toward a normal angular position about a seat axis extending substantially perpendicular to the top seating surface while allowing the bicycle seat to be forced away this normal angular position in either a clockwise or a counterclockwise direction about said seat axis by pressure applied by the rider to the bicycle seat when pedaling the bicycle;

wherein said frame mount includes a bottom shaft for being fixedly attached to the bicycle frame at a bottom end and for being fixedly attached to the rotationally-biased centering means at a top end;

wherein the seat mount includes a top shaft for being attached to the seat at a top end and for being attached to said rotationally-biased centering means at a bottom end thereof; and wherein the rotationally-biased centering means comprises male and female telescoping members, each respectively attached to one of the top and bottom shafts, and said biasing means is a spring member which interconnects the male and female telescoping members.

2. The bicycle-seat support as in claim 1 wherein said male and female telescoping members include stops for limiting angular motion of said bicycle seat away from said normal angular position in either said clockwise or said counterclockwise direction about said seat axis.

3. The bicycle-support as in claim 2 wherein said stops comprise a pin mounted on one of said male and female telescoping members which engages a slot in the other of said male and female telescoping members.

4. The bicycle-seat support as in claim 2, wherein said spring member is a coil spring and said coil spring encircles said male telescoping member and is position inside said female telescoping member.

5. The bicycle-seat support as in claim 4 wherein the stops are surfaces of said male and female members which contact said coil spring.

6. The bicycle-seat support as in claim 1 wherein said spring member is a coil spring and said coil spring encircles said male telescoping member and is positioned inside female telescoping member.

7. The bicycle-seat support as in claim 1 wherein there is a bearing interface between the male and female telescoping members for allowing said male and female members to rotate relative to one another about said seat axis while not allowing substantial relative axial movement along said seat axis.

8. The bicycle-seat support as in claim 1 wherein said rotationally-biased centering means further includes a bearing interface between bearing members respectively attached to said seat mount and said frame mount for allowing said seat mount and said frame mount to rotate relative to one another about said seat axis while not allowing said seat mount and frame mount substantial relative axial movement along said seat axis.

9. The bicycle-seat support as in claim 8 wherein said rotationally-biased centering means further includes stops for limiting the angular motion of said bicycle seat away from said normal angular position in either said clockwise or said counterclockwise direction about said seat axis.

10. A bicycle having a bicycle seat mounted on a frame of the bicycle at an attitude for allowing a rider of the bicycle to conveniently sit on a top seating surface of the bicycle seat and pedal the bicycle, there being a bicycle seat support mounted between the frame and the seat of the bicycle, said bicycle-seat support comprising:

a seat mount attached to the bicycle seat;

a frame mount attached to the frame of the bicycle;

a rotationally-biased centering means for coupling the seat mount to the frame mount, said centering means including a biasing means for causing the seat mount and the attached bicycle seat to rotate toward a normal angular position about a seat axis extending substantially perpendicular to the top seat surface while allowing the bicycle seat to be forced away from this normal angular position in either a clockwise or a counterclockwise direction about said seat axis by pressure applied by the rider to the bicycle seat when pedaling the bicycle.

11. The bicycle as in claim 10, wherein said frame mount includes a bottom shaft fixedly attached to the bicycle frame at a bottom end and fixedly attached to the rotationally-biased centering means at a top end.

12. The bicycle as in claim 11 wherein the seat mount includes a top shaft attached to the seat at a top end and attached to said rotationally-biased centering means at a bottom end thereof.

13. The bicycle as in claim 12 wherein the rotationally-biased centering means comprises male and female telescoping members, each respectively attached to one of the top and bottom shafts, and said biasing means is a spring member which interconnects the male and female telescoping members.

14. The bicycle as in claim 13 wherein said male and female telescoping members include stops for limiting angular motion of said bicycle seat away from said normal angular position in either said clockwise or said counterclockwise direction about said seat axis.

15. The bicycle as in claim 14 wherein said stops comprise a pin mounted on one of said male and female telescoping members which engages a slot in the other of said male and female telescoping members.

16. The bicycle as in claim 14, wherein said spring member is a coil spring and said coil spring encircles said male telescoping member and is positioned inside said female telescoping member.

17. The bicycle as in claim 16 wherein the stops are surfaces of said male and female members which contact said coil spring.

18. The bicycle as in claim 13 wherein said spring member is a coil spring and said coil spring encircles said male telescoping member and is position inside said female telescoping member.

19. The bicycle as in claim 13 wherein there is a bearing interface between the male and female telescoping members for allowing said male and female members to rotate relative to one another about said seat axis while not allowing substantial relative axial movement along said seat axis.

20. The bicycle as in claim 10 wherein said rotationally-biased centering means further includes a bearing interface between bearing members respectively attached to said seat mount and said frame mount for allowing said seat mount and said frame mount to rotate relative to one another about said seat axis while not allowing said seat mount and frame mount substantial relative axial movement along said seat axis.

21. The bicycle as in claim 20 wherein said rotationally-biased centering means further includes stops for limiting the angular motion of said bicycle seat away from said normal angular position in either said clockwise or said counterclockwise direction about said seat axis.

* * * * *